United States Patent [19]

Gargini

[11] 3,886,456

[45] May 27, 1975

[54] WIRED BROADCASTING SYSTEMS PROVIDING TELEPHONE COMMUNICATION

[75] Inventor: Eric John Gargini, West Drayton, England

[73] Assignee: Communications Patents Limited, London, England

[22] Filed: Nov. 28, 1972

[21] Appl. No.: 310,118

[30] Foreign Application Priority Data

Dec. 3, 1971 United Kingdom .............. 56299/71

[52] U.S. Cl. .............. 325/308; 179/2 E; 179/2 TV; 178/DIG. 13

[51] Int. Cl. .......................................... H04m 11/08

[58] Field of Search ....... 179/2 TV, 2 R, 2 DP, 2 E, 179/2 C, 2 AS, 1 B; 325/31, 308; 178/DIG. 13

[56] References Cited

UNITED STATES PATENTS

| | | | |
|---|---|---|---|
| 3,244,809 | 4/1966 | Fuller | 325/308 |
| 3,277,243 | 10/1966 | Fairbairn | 179/2 DP |
| 3,350,647 | 10/1967 | Gabriel et al. | 325/308 |
| 3,587,053 | 6/1971 | Horzepa | 179/2 TV |
| 3,691,295 | 9/1972 | Fisk | 178/DIG. 13 |

OTHER PUBLICATIONS

Gabriel, R.P., Dial A Program, Proc. IEEE, Vol. 58, No. 7, July 7, 1970.

*Primary Examiner*—George H. Libman
*Attorney, Agent, or Firm*—Laurence R. Brown

[57] ABSTRACT

A wired broadcasting system in which subscribers are connected to a programme exchange through their own individual pairs of twisted conductors. Each pair is associated with an intersticial pair of conductors suitable for low frequency signals. Provision is made for connecting conventional telephone instruments at the subscriber station which is linked to a telephone exchange through a pair of the said conductors.

14 Claims, 6 Drawing Figures

PATENTED MAY 27 1975 3,886,456

SHEET 2

WIRED BROADCASTING SYSTEMS PROVIDING TELEPHONE COMMUNICATION

The present invention relates to wired broadcasting systems by which a number of television or other programmes may be transmitted through a distribution network to a plurality of subscribers who are able to select desired programmes.

Various systems have been proposed to make a number of television transmissions available to subscribers, and a system which has been developed by the applicants which offers a number of advantages over alternative systems is described in U.S. Pat. No. 3,693,090 issued Sept. 19, 1972 based on the use of programme exchanges serving a group of subscribers each of whom has his own individual vision circuit to the programme exchange, provided by a twisted pair of conductors with intersticial conductors associated with each pair which are suitable for audio frequency circuits and/or for the transmission of signals for controlling switch means at the programme exchange whereby any of a number of programmes may be selected by the subscriber and applied to the twisted pair vision circuit for transmission to that subscriber. In general a number of such programme exchanges distributed over the network area receive a number of colour transmissions through a trunk network from a central programme station, commonly referred to as the transmitter.

Such a system is extremely versatile and may be used not only for the transmission of vision signals from the programme exchanges to the individual subscribers, but a wide range of other facilities can be provided.

In many cases the subscriber will also be a telephone subscriber, and it has been realised that telephone service to the subscriber may be provided by the intersticial conductors of the wired broadcasting system. The present invention is concerned with methods by which telephone service may be combined with a wired broadcasting system of the character referred to without involving an independent wire for the telephone service.

These requirements can be satisfied by utilising the intersticial pair for telephone service and by the provision of any of several ways for performing the required switching at the programme exchange. The equipment incorporates means to avoid interference between selection signals initiated by the subscriber for selecting some particular service through the broadcasting network and the telephone network.

Accordingly, the invention provides a wired broadcasting system in which each of a plurality of subscribers is connected to a programme exchange through the intermediary of a twisted pair of high frequency conductors suitable for the transmission of high frequency television signals having associated therewith intersticial audio frequency conductors suitable for the transmission of audio frequency signals and in which means are provided whereby a telephone instrument at the subscribers premises may be connected to a telephone exchange through a pair of said wired broadcasting conductors.

The invention also provides a wired broadcasting system in which the audio frequency conductors are employed to connect the telephone instrument to a telephone exchange and signalling and control of the television programme selector switch at the programme exchange is effected through the high frequency conductors in conjunction with a return path formed be a cable screen about the conductors between the programme exchange and the subscriber.

Further, the invention provides a wired broadcasting system in which the audio frequency conductors are employed to connect the telephone instrument to a telephone exchange and signalling and control of the television programme selector switch at the programme exchange is effected by polarised direct current signalling through the high frequency pair in conjunction with polarised responsive devices at the programme exchange.

Still further, the invention provides a wired broadcasting system in which the audio frequency conductors are employed selectively to connect the telephone instrument to a telephone exchange and for the signalling and control of the subscribers television programme selector switch at the programme exchange, operation of the subscribers selector switch resulting in disconnection of the telephone circuit during the period required for television programme selection.

In order that the invention may be more readily understood three particular embodiments thereof will now be described, by way of example only, with reference to the accompanying drawings, in which.

Figure 1:
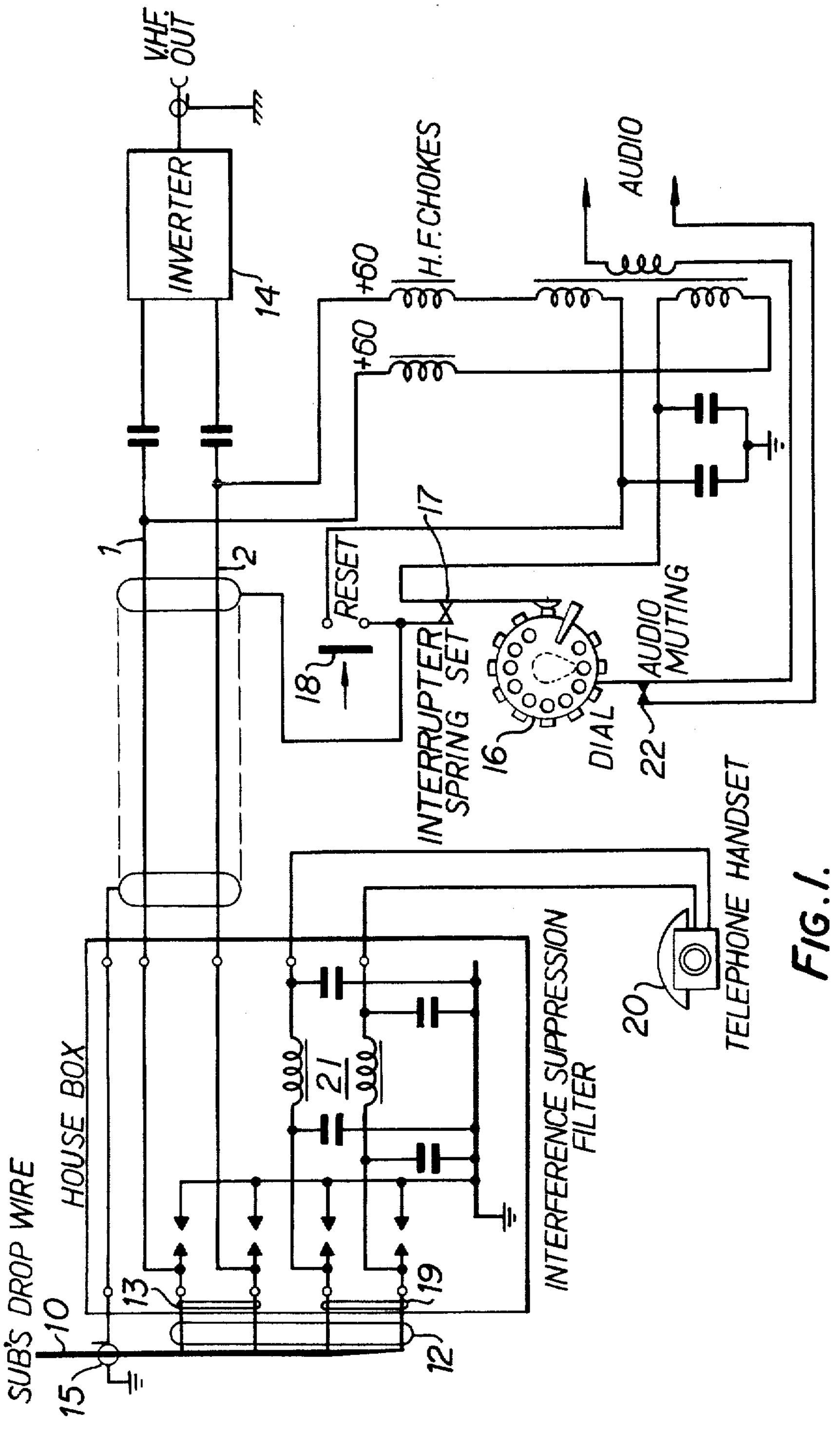
FIGS. 1 and 2 show respectively the subscriber's equipment and the programme exchange equipment according to a first embodiment of the invention.
Figure 3:
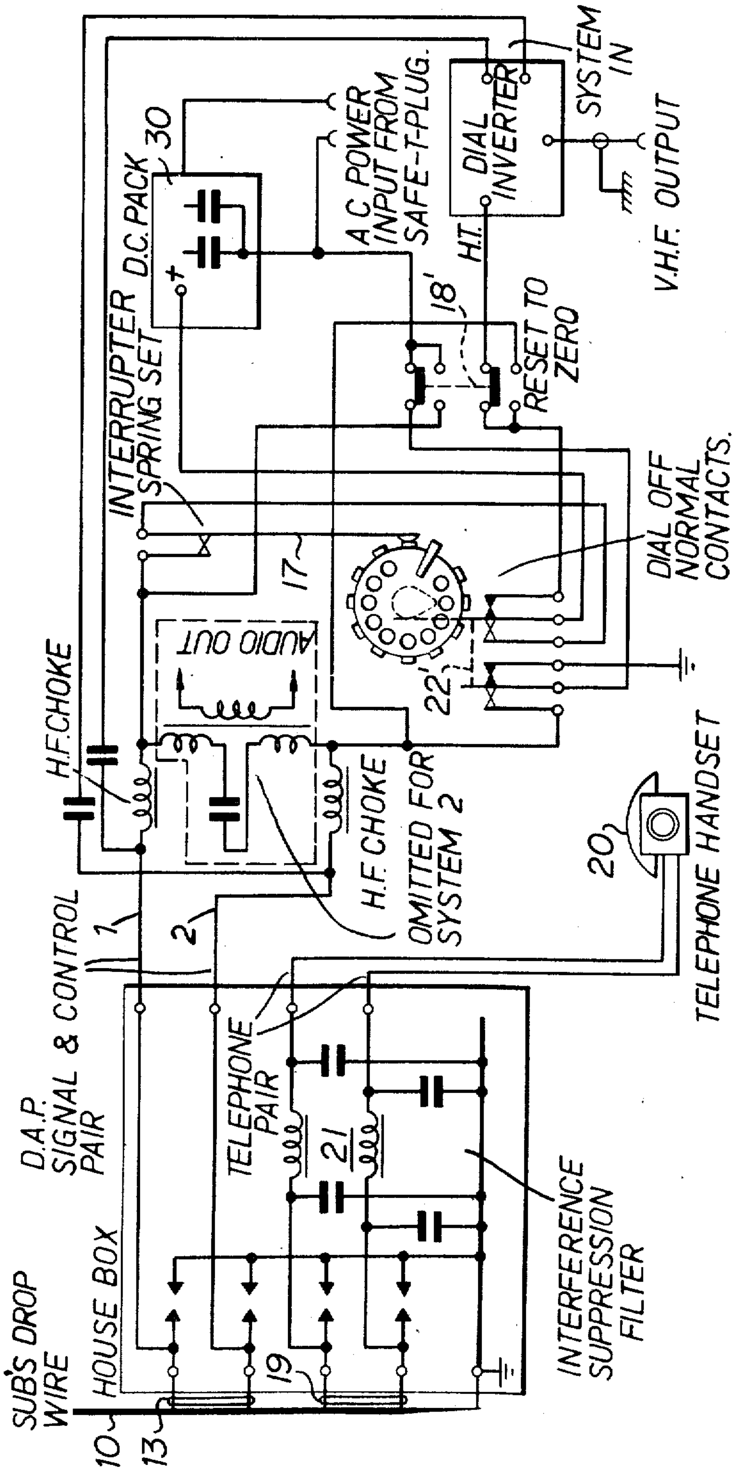
FIGS. 3 and 4 show similarly the features of a second embodiment of the invention.
Figure 5:
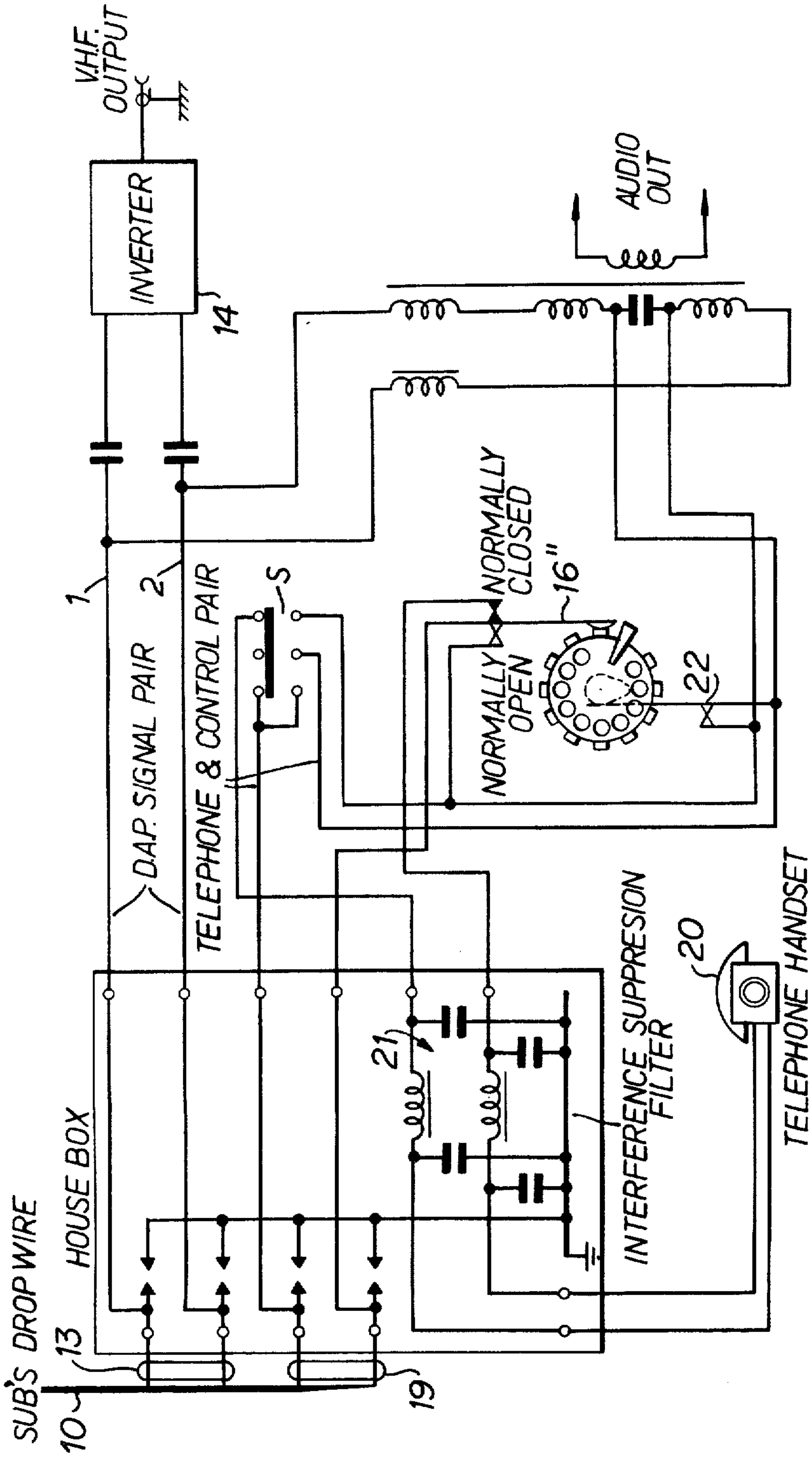
FIGS. 5 and 6 show similarly the features of a third embodiment of the invention.

In all cases the drawings bear explanatory markings and various components are shown in the conventional manner so that a full description of the details is not necessary. In FIGS. 1, 3 and 5 the essential parts of the subscriber's equipment are shown diagrammatically the input from the supply cable being shown as a drop wire 10 with the four connecting leads 12 for one subscriber, one pair 13 comprising the vision circuit feeding an inverter 14 providing a VHF output to the input terminal of the television receiver. In the case of FIG. 1 the subscriber's drop wire forms part of a cable having a cable sheath 15 which is used for the return path for signalling by the application of a direct current path to either of the vision wires 1 or 2.

The subscriber's control switch is shown as a conventional telephone dial 16 the springset 17 of which is adapted to apply a direct current path during subscriber selection to the vision line 1 leading to the drop wire 10. A reset switch 18 is also shown which applies a direct current path to the vision line 2 providing for signalling to the programme exchange equipment. The other two wires of the subscriber's drop wire 19 feed cable which are the intersticial conductors are connected at the subscriber's equipment to the normal telephone handset 20 as indicated.

It will be noted that the audio circuits are fed through a hybrid transformer 21, the audio lines being muted by the off-normal muting contacts 22 of the subscriber's dial selector while the springset 17 is adapted to transmit direct current signalling pulses into the vision line 1 the return path for which is provided through the cable sheath 15. The subscriber's reset switch 18 is adapted to supply a direct current connection between the cable sheath and the line 2. It will be seen that the intersticial pair of conductors 19 in the feed cable are connected at all times to the telephone handset 20 so that the telephone is available whenever required.

Figure 2:
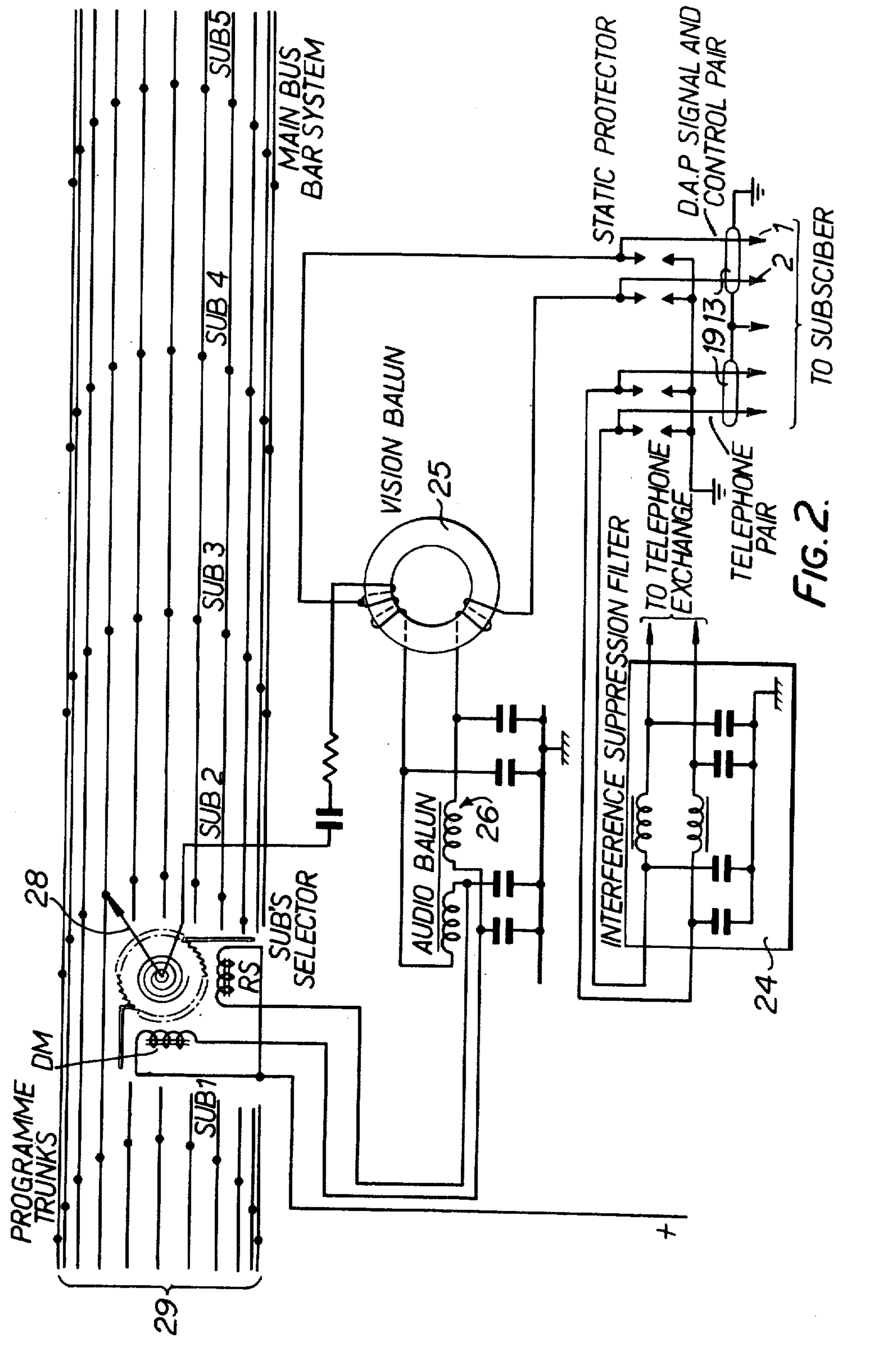

FIG. 2 shows the circuit at the programme exchange. It will be noted that one pair 19, the telephone pair, of the subscriber's lines is connected through a suppression filter 24 to the telephone exchange network (not shown) while the vision pair 13 is connected through video and audio balancing transformers 25, 26 to the moving member of the selector switch 28 so that a programme picked up from any of the programme trunks 29 may be transmitted to the subscriber in accordance with signals originated by him over the control pair 13. These signals are extracted by the balancing transformer systems and fed in the case of the drive signals passed through line 1 of the subscriber's cable, to operate the driving magnet DM of the rotary selector switch which causes switch 28 to switch from trunk to trunk. Operation of the reset switch at the subscriber's station on the other hand operates the magnet RS which releases the subscriber's switch so that it returns to a normal or datum position at a preselected trunk.

Figure 4:
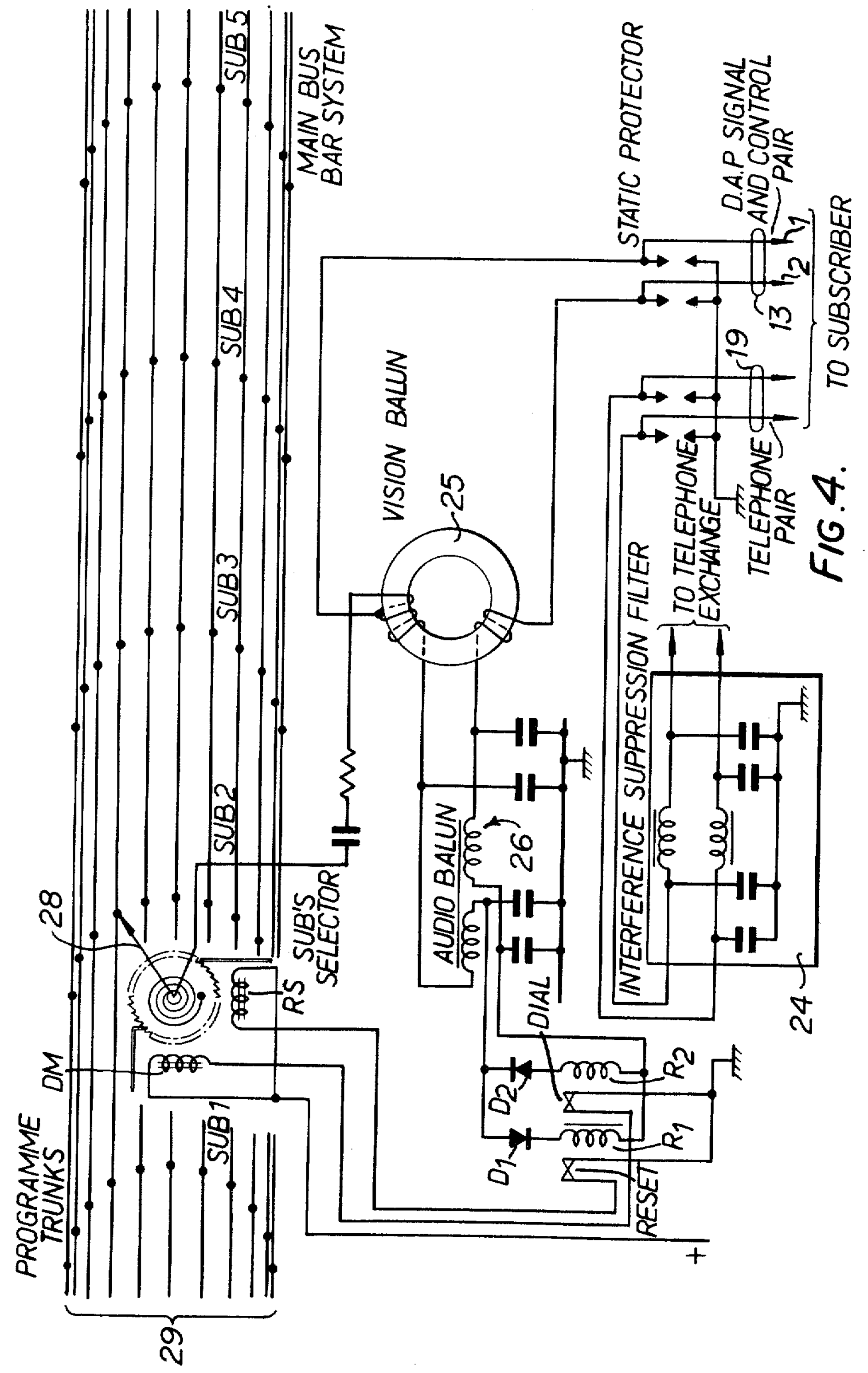

FIGS. 3 and 4 illustrate a system which has a number of features common to FIGS. 1 and 2 and thus carries similar reference characters with primes showing elements in modified form, but signalling is performed by selective polarity signalling between the two vision lines 1 and 2 thus avoiding the need for a return path through a cable sheath, the selective signalling conditions operating different relays R1 and R2 at the programme exchange (FIG. 4). It will be noted in FIG. 3 that AC power is taken from an input power supply to operate a DC power pack 30 which is adapted to transmit dial signals of one polarity between the lines 1 and 2 or of the other polarity for the reset pulse. Additional off-normal contacts are required to provide the contact pair 22' at the subscriber's selector dial and similarly additional contacts are required for the reset switch 18.

As shown in FIG. 4 which is generally similar to FIG. 2, signals received from the vision lines 1 and 2 are extracted by the video and audio balancing transformers 25 and 26 and operate one of two relays R1 or R2 associated with diodes D1 and D2 according to the signal polarity transmitted by the subscriber. The relay R2 transmits dialling pulses to the drive magnet DM and the relay R1 transmits the reset pulse to the reset magnet RS. The intersticial pairs of conductors 19 are connected to the telephone network through an interference suppression filter 24 as in the case of FIG. 2.

Figure 6:
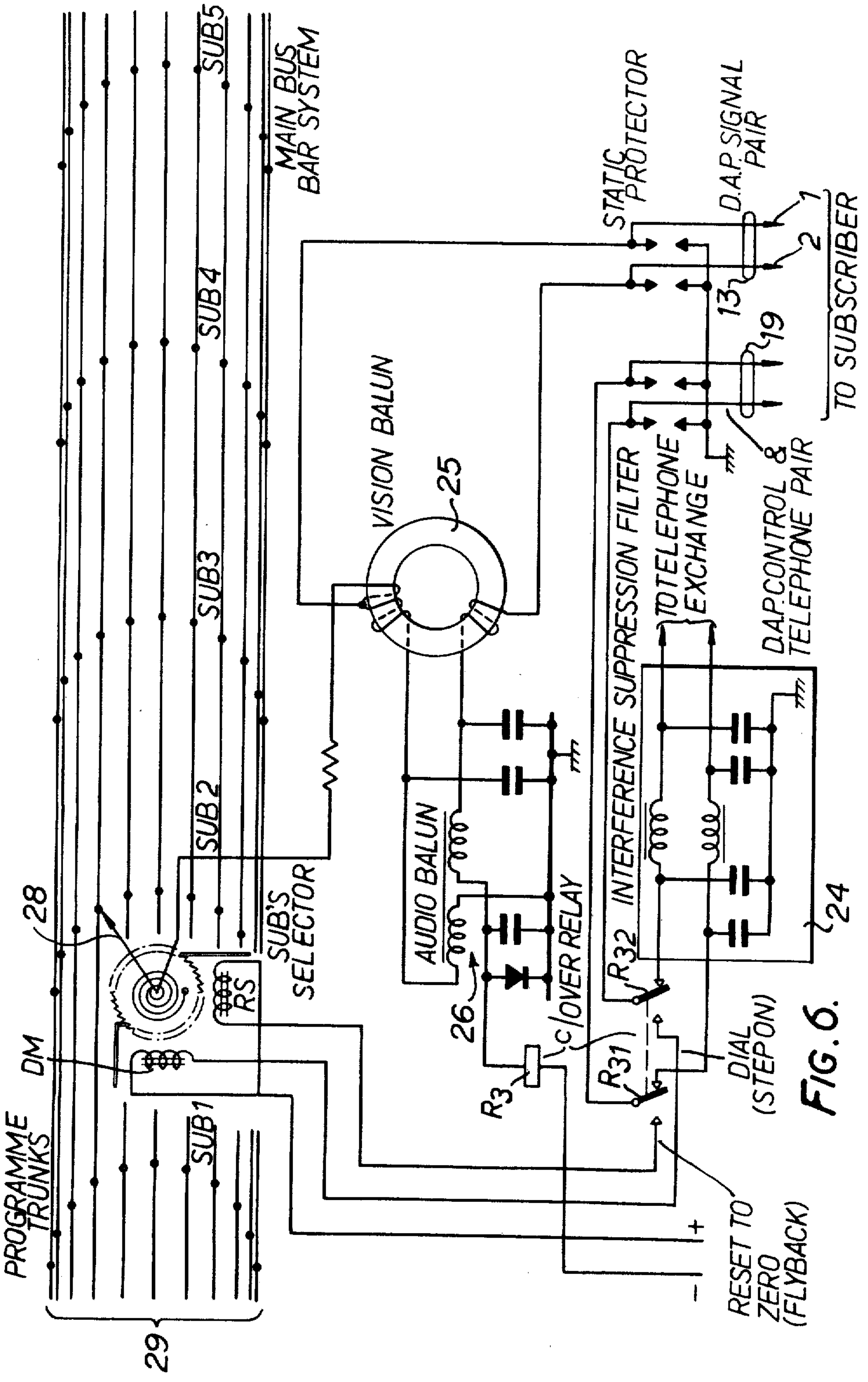

FIGS. 5 and 6 show an arrangement in which the intersticial control conductors 19 of the feed cable are shared between the telephone service and control signals for operating the subscriber's switch at the programme exchange. As shown in FIG. 5 the telephone handset 20 and the control dial contacts 16 of the subscriber's selector equipment are selectively connected to the control lines 19 through a control switch S which is operated by the subscriber when he wishes to perform programme selection by means of his selector dial. Operation of the switch for this purpose disconnects the telephone handset while programme selection is in process and mutes the audio feed to the subscriber's television receiver while the telephone is in use. It will be noted that operation of the switch S to its alternative programme selection position results in applying DC conditions across the vision lines 1 and 2.

Thus, in the unoperated position of switch S shown in FIG. 5, one telephone wire is connected to one wire of control pair 19 and this is disconnected upon operation of switch S. Upon operation switch 5 shorts out the condenser connected in the audio output transformer circuit to apply the DC condition across vision lines 1 and 2 to thereby ground and energize relay R3 (FIG. 6). Off normal contacts 22 mute the audio in the same manner as in FIG. 1. The operation of switch S also serves to place DC ground upon one of the control conductors 19 so that switch 16'' can apply the DC pulses thereto in response to operation of the dial.

At the programme exchange shown in FIG. 6, this operation results in energisation of a control relay R3 having changeover contacts R31 and R32 which in the normal position shown connect the control pair 19 of the subscriber's cable 10 to the telephone network (not shown). Conversely on operation of the relay R3 the contacts R31 and R32 connect the control lines to the driving magnet DM or the reset magnet RS of the selector switch 28. It will be appreciated that with this circuit the telephone is disconnected for a short period during programme selection or resetting by the subscriber.

I claim:

1. A wired broadcasting system in which each of a plurality of subscribers is connected to a programme exchange through the intermediary of a cable with a twisted pair of high frequency conductors suitable for the transmission of high frequency television signals and having associated therewith a twisted pair of intersticial audio frequency conductors suitable for the transmission of audio frequency signals and in which means are provided including a central programme exchange with programme selection means and a telephone exchange, a telephone instrument at the subscribers premises connected to said telephone exchange through said pair of intersticial conductors, means at said subscribers premises for sending DC signals over at least one of the high frequency conductors to operate said programme selection means, a television programme selector switch, means effecting signalling and control of the television programme selector switch at the programme exchange through the high frequency conductors in conjunction with a return path formed by a cable screen about the conductors between the programme exchange and the subscriber, a dial selector having off normal contacts connected to mute the audio, means to introduce direct current signalling pulses into one of the high frequency conductors, and means providing that audio frequency signals for television or radio sound programmes are carried by the high frequency conductors and are coupled to the subscriber's equipment through a transformer having an audio path blocked by said off normal muting contacts during operation of said dial selector to apply direct current signalling pulses into one of the high frequency conductors.

2. A wired broadcasting system as claimed in claim 1, including a subscriber's control switch with a dial selector and springset, and means including the springset adapted to apply a direct current path between one of the high frequency conductors and the cable screen to effect programme selection.

3. A wired broadcasting system as claimed in claim 1, including a program selection switch with means resetting it to a datum position, wherein a reset switch is provided for operation by the subscriber which is adapted to apply a direct current path between one of the high frequency conductors and the cable screen for returning the subscriber's programme selection switch to a datum position.

4. A wired broadcasting system in which each of a plurality of subscribers is connected to a programme exchange through the intermediary of a cable with a twisted pair of high frequency conductors suitable for the transmission of high frequency television signals and having associated therewith a twisted pair of interstícial audio frequency conductors suitable for the transmission of audio frequency signals and in which means are provided including a central programme exchange with programme selection means and a telephone exchange, a telephone instrument at the subscribers premises connected to said telephone exchange through said pair of intersticial conductors, and means at said subscribers premises for sending DC signals over at least one of the high frequency conductors to operate said programme selection means having a television programme selector switch and including means effecting signalling and control of the television programme selector switch at the programme exchange by polarised direct current signalling through the high frequency pair and polarised responsive devices at the programme exchange responding to said polarised direct current to operate said selector switch, wherein the polarised responsive devices comprise two relays, one being arranged to effect selection of television programmes by means of the subscriber' s television programme selector switch and the other being arranged to effect return of the subscriber's television programme selector switch to a datum position.

5. A wired broadcasting system as claimed in claim 4, wherein the signalling potential is derived locally at the subscriber's premises.

6. A wired broadcasting system as claimed in claim 5, wherein the subscriber's equipment comprises an AC driven DC power supply with means connecting output terminals to the high frequency conductors with one or other polarity depending upon the relay to be selected.

7. A wired broadcasting system as claimed in claim 4, including means wherein at the programme exchange signals received from the high frequency pair are extracted through a vision and sound balancing transformer and are arranged to operate either of said two polarised relays.

8. A wired broadcasting system as claimed in claim 7, wherein the polarised relays are formed by non polarised relays each having associated therewith a diode.

9. A wired broadcasting system in which each of a plurality of subscribers is connected to a programme exchange through the intermediary of a cable with a twisted pair of high frequency conductors suitable for the transmission of high frequency television signals and having associated therewith a twisted pair of intersticial audio frequency conductors suitable for the transmission of audio frequency signals and in which means are provided including a central programme exchange with programme selection means and a telephone exchange, a telephone instrument at the subscribers premises connected to said telephone exchange through said pair of intersticial conductors, and means at said subscribers premises for sending DC signals over at least one of the high frequency conductors to operate said programme selection means having a subscriber's television programme selector switch and including means effecting signalling and control of the subscriber's television programme selector switch at the programme exchange, and means coupled with the subscriber's selector switch disconnecting the telephone circuit during the period required for television programme selection.

10. A wired broadcasting system as claimed in claim 9, including means selectively connecting the telephone instrument and the subscriber's programme selector switch to the conductor pairs through a subscriber actuable switch.

11. A wired broadcasting system as claimed in claim 10, wherein the subscriber actuable switch is biased to a position in which the telephone instrument is connected to the audio frequency pair and is actuable to connect the programme selector switch thereto at those times when the subscriber desires to effect programme selection.

12. A wired broadcasting system as claimed in claim 11, including means connected to said subscriber actuable switch effective to mute the audio feed to the subscriber's equipment whilst the telephone is in use.

13. A wired broadcasting system as claimed in claim 9, including means responsive to actuation of the subscriber's selector switch effective to apply DC signals to the high frequency pair.

14. A wired broadcasting system as claimed in claim 9, wherein at the programme exchange a control relay having change over contacts is provided, and means operating said contacts in the normal position to connect the audio frequency pair to the telephone exchange and in the other position to the television programme selection equipment.

* * * * *